US011401146B2

(12) United States Patent
Britton et al.

(10) Patent No.: US 11,401,146 B2
(45) Date of Patent: Aug. 2, 2022

(54) AIR CYLINDER DRIVEN MOBILE ASSEMBLY SUPPORT UNIT

(71) Applicant: Toyota Motor Engineering & Manufacturing North America, Inc., Plano, TX (US)

(72) Inventors: David A. Britton, Florence, KY (US); James C. Greenlee, II, Paris, KY (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 435 days.

(21) Appl. No.: 16/714,883

(22) Filed: Dec. 16, 2019

(65) Prior Publication Data

US 2021/0179407 A1 Jun. 17, 2021

(51) Int. Cl.

| | |
|---|---|
| ***B66F 11/04*** | (2006.01) |
| ***E04G 1/24*** | (2006.01) |
| ***E04G 3/28*** | (2006.01) |
| ***B23P 21/00*** | (2006.01) |
| ***B62D 65/00*** | (2006.01) |

(52) U.S. Cl.

CPC ............... *B66F 11/04* (2013.01); *B23P 21/00* (2013.01); *B62D 65/00* (2013.01); *E04G 1/24* (2013.01); *E04G 3/28* (2013.01); *E04G 2001/242* (2013.01); *E04G 2003/283* (2013.01)

(58) Field of Classification Search

CPC .......... B66F 11/04; B23P 21/00; B62D 65/00; B62D 65/022; E04G 1/24; E04G 3/28; E04G 2001/242; E04G 2003/283

See application file for complete search history.

(56) References Cited

U.S. PATENT DOCUMENTS

| | | | | |
|---|---|---|---|---|
| 5,513,428 | A | 5/1996 | Shiramizu et al. | |
| 8,162,302 | B2 * | 4/2012 | Turner | B25H 1/10 269/53 |
| 8,166,634 | B2 | 5/2012 | Tohyama et al. | |
| 8,627,942 | B2 * | 1/2014 | Terazawa | B62D 65/18 198/465.1 |
| 2007/0241523 | A1 * | 10/2007 | Lewman | B25H 5/00 280/32.5 |
| 2018/0319007 | A1 * | 11/2018 | Wilkinson | B25H 5/00 |

FOREIGN PATENT DOCUMENTS

| | | | |
|---|---|---|---|
| JP | 2002036035 | A | 2/2002 |
| JP | 4548590 | B2 | 9/2010 |
| JP | 5347578 | B2 | 11/2013 |
| KR | 0115942 | Y1 | 4/1998 |

* cited by examiner

*Primary Examiner* — Ryan J. Walters

(74) *Attorney, Agent, or Firm* — Dinsmore & Shohl LLP

(57) ABSTRACT

A mobile assembly support unit that includes an assembly line sync mechanism having a line engagement unit coupled to a rotatable sync arm, a propulsion unit having a propulsion wheel and a propulsion motor, a translation arm coupled to the propulsion unit and engageable with the rotatable sync arm, and an air cylinder coupled to the propulsion unit. The air cylinder is actuatable between a retracted position and an extended position such that when the air cylinder is in the retracted position, the translation arm is engaged with the rotatable sync arm and the propulsion unit is in a lifted position and when the air cylinder is in the extended position, the translation arm is disengaged with the rotatable sync arm and the propulsion unit is in a descended position.

11 Claims, 2 Drawing Sheets

AIR CYLINDER DRIVEN MOBILE ASSEMBLY SUPPORT UNIT

TECHNICAL FIELD

The present specification generally relates to apparatuses for supporting and transporting technicians and equipment during the assembly of a manufacturing article.

BACKGROUND

Assembly lines in a manufacturing process use a plurality of machines, tools, and technicians, which operate synchronously to assembly a manufacturing article, such as a vehicle, with efficiency and precision. One technique to achieve synchronization in an assembly line process is by using synchronization units that connect and disconnect with an assembly line stage, which carries the manufacturing article. Synchronization units provide a location for a technician to operate from while travelling along the assembly line with the manufacturing article. However, current synchronization units use a multitude of different motors and/or power units to independently operate the variety of functions of the synchronization units increasing the weight and energy usage of each synchronization unit. This reduces efficiency and increases the cost of the assembly process.

Accordingly, there is an ongoing need for more efficient synchronization units that rely on a minimal number of motors and/or power units to function.

SUMMARY

In one or more embodiments, a mobile assembly support unit includes an assembly line sync mechanism having a line engagement unit coupled to a rotatable sync arm, a propulsion unit having a propulsion wheel and a propulsion motor, a translation arm coupled to the propulsion unit and engageable with the rotatable sync arm, and an air cylinder coupled to the propulsion unit. The air cylinder is actuatable between a retracted position and an extended position such that when the air cylinder is in the retracted position, the translation arm is engaged with the rotatable sync arm and the propulsion unit is in a lifted position and when the air cylinder is in the extended position, the translation arm is disengaged with the rotatable sync arm and the propulsion unit is in a descended position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
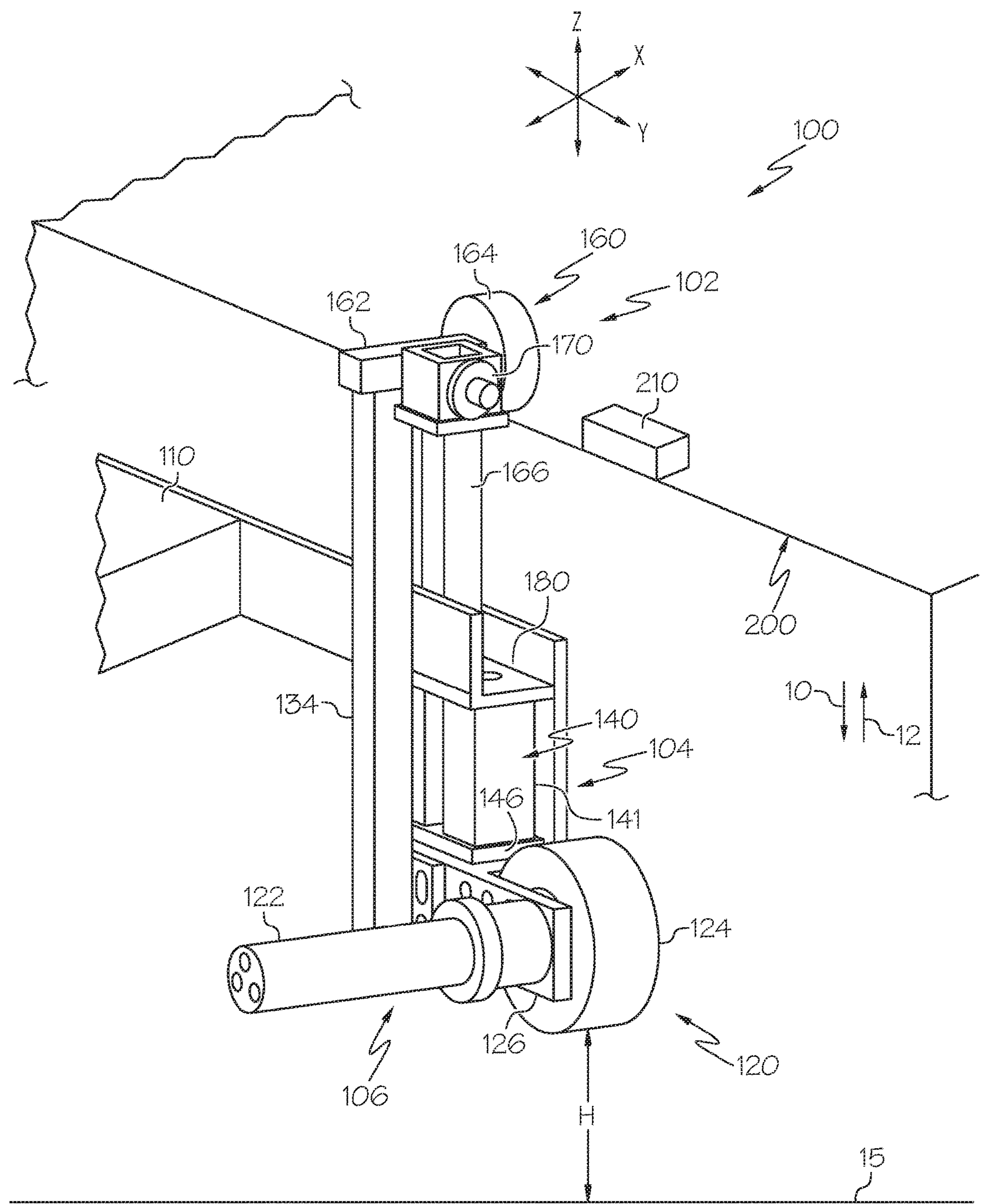
FIG. 1 schematically depicts a mobile assembly support unit engaged with an assembly line stage, according to one or more embodiments shown and described herein.

Embodiments described herein are directed to a mobile assembly support unit that provides a mechanism to support assembly line technicians and assembly line equipment such that these technicians may more easily work along an assembly line. The mobile assembly support unit includes an assembly line sync mechanism to facilitate connection with an assembly line platform that holds a manufacturing article, such as a vehicle, allowing the mobile assembly support unit to travel with the assembly line platform and the manufacturing article. The mobile assembly support unit also includes a propulsion unit that provides a drive mechanism for the mobile assembly support unit, for example, when disconnected with the assembly line platform. In addition, the mobile assembly support unit includes a single air cylinder that moves the propulsion unit into and out of engagement with a factory floor and simultaneously moves the assembly line sync mechanism into and out of engagement of the assembly line platform. By operating with a single air cylinder, the mobile assembly support unit reduces the energy usage when compared to previous synchronization units and facilitates synchronous motion of the assembly line sync mechanism and the propulsion unit. Embodiments of the mobile assembly support unit will now be described and, whenever possible, the same reference numerals will be used throughout the drawings to refer to the same or like parts.

Figure 2:
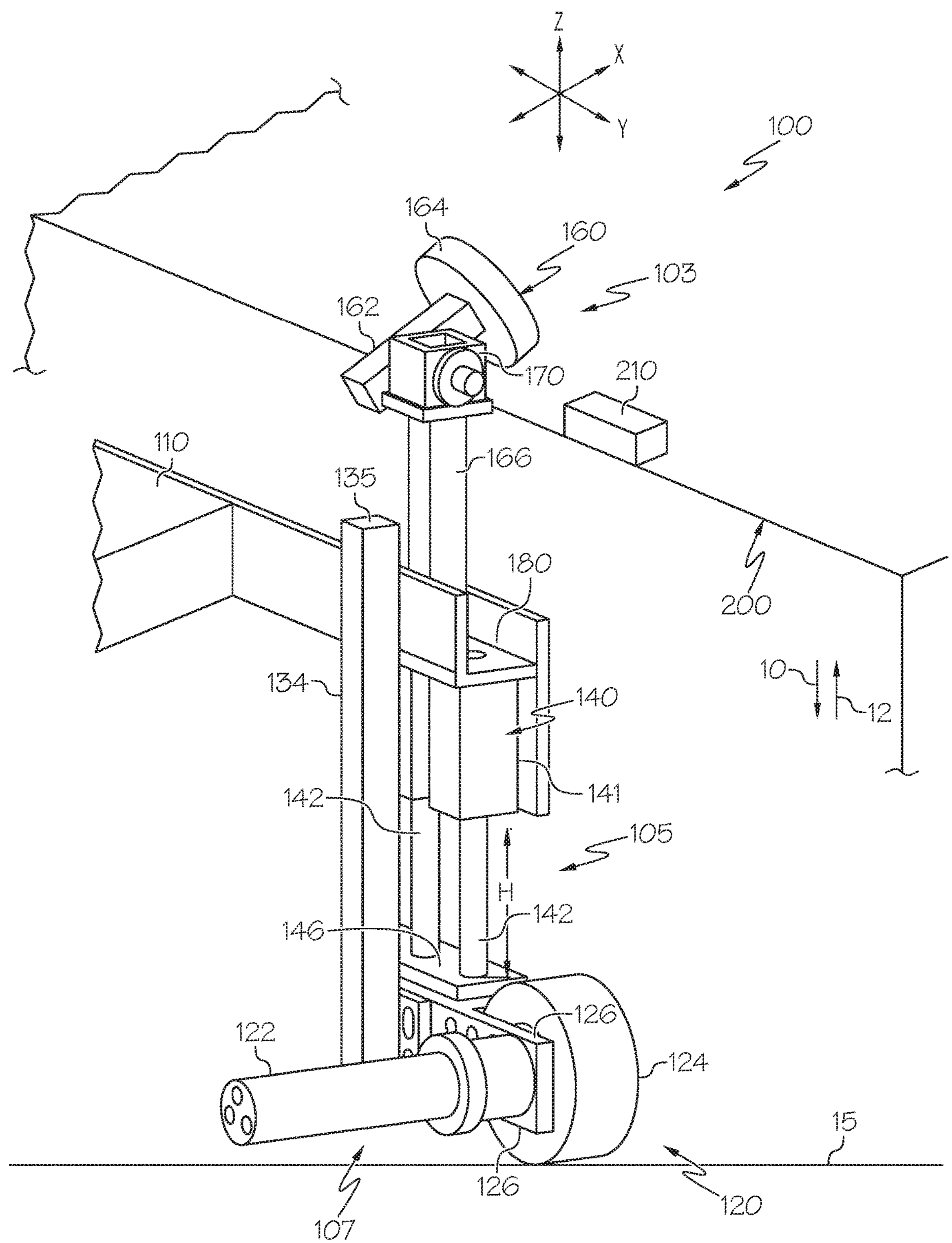
FIG. 2 schematically depicts the mobile assembly support unit of FIG. 1 disengaged with the assembly line stage, according to one or more embodiments shown and described herein.

Referring now to FIGS. 1 and 2, a mobile assembly support unit 100 comprising an assembly line sync mechanism 160, a propulsion unit 120, and an air cylinder 140 coupled to the propulsion unit 120 is depicted. The mobile assembly support unit 100 supports assembly line technicians and assembly line equipment during a manufacturing operation, for example, on a platform 110. The assembly line sync mechanism 160 of the mobile assembly support unit 100 is configured to engage with an assembly line block 210 of an assembly line stage 200 and the propulsion unit 120 of the mobile assembly support unit 100 is configured to drive the mobile assembly support unit 100 when the mobile assembly support unit 100 is disengaged from the assembly line stage 200, for example, along a factory floor 15.

In operation, the assembly line stage 200 provides a platform for a manufacturing article, such as a vehicle undergoing assembly, to be transported along an assembly line. When the assembly line sync mechanism 160 is engaged with the assembly line stage 200, the mobile assembly support unit 100 moves together with the assembly line stage 200, synchronizing the technician with the manufacturing article. This allows the technician to operate on the manufacturing article. Further, when the assembly line sync mechanism 160 is disengaged with the assembly line stage 200, the mobile assembly support unit 100 is able to operate independent from the assembly line stage 200. Disengagement allows the mobile assembly support unit 100 to travel to another location within the factory, for example, to engage with a different portion of the assembly line stage 200. As one example, the mobile assembly support unit 100 may be used to support the installation of trim in a vehicle, however, it should be understood that the mobile assembly support unit 100 may be useful in a variety of manufacturing settings that use an assembly line.

The assembly line sync mechanism 160 comprises a line engagement unit 164 coupled to a rotatable sync arm 162. The rotatable sync arm 162 is rotatable between a line engagement position 102 (FIG. 1) and a line disengagement position 103 and is spring biased into the line disengagement position 103 (FIG. 2). Thus, without application of an outside force, the rotatable sync arm 162 remains in the line disengagement position 103 (FIG. 2). The line engagement unit 164 is mounted to an end of the rotatable sync arm 162 and is sized and shaped to engage with the assembly line block 210 of the assembly line stage 200. For example, in the embodiment depicted in FIGS. 1 and 2, the line engagement unit 164 is a wheel shape, but it should be understood that in other embodiments the line engagement unit 164 may comprise a variety of shapes, such as a square or rectangular shape. Further, the wheel shape embodiment of the line engagement unit 164 allows the mobile assembly support unit 100 to more easily breakaway from the assembly line block 210, if needed. The assembly line sync mechanism 160 further comprises a mounting arm 166 and the rotatable sync arm 162 is rotatably coupled to the mounting arm 166. The assembly line sync mechanism 160 may also include a mounting cap 170 coupled to the end of the mounting arm 166 where the rotatable sync arm 162 is attached. The mounting cap 170 includes a through bore and a mounting cap bolt 172 extends through a bushing 174 and the through bore of the mounting cap 170 to rotatably couple the rotatable sync arm 162 with the mounting arm 166.

The propulsion unit 120 of the mobile assembly support unit 100 includes a propulsion wheel 124 and a propulsion motor 122 each coupled to a propulsion unit support bracket 126, which connects the propulsion wheel 124 and the propulsion motor 122 with the rest of the mobile assembly support unit 100. The propulsion motor 122 may comprise a pneumatic air motor. Further, the propulsion wheel 124 is operated by the propulsion motor 122 and the propulsion wheel 124 provides the mobile assembly support unit 100 with a drive mechanism. For example, when the mobile assembly support unit 100 is disengaged from the assembly line stage 200, the propulsion wheel 124 allows the mobile assembly support unit 100 to travel through the factory.

The air cylinder 140 is an actuatable pneumatic mechanism and is actuatable between a retracted position 104 (FIG. 1) and an extended position 105 (FIG. 2). As shown in FIG. 2, the air cylinder 140 comprises a cylinder block 141, a cylinder base 146, and one or more cylinder rods 142 coupled to the cylinder base 146 and extendable outward from the cylinder block 141. When transitioning from the retracted position 104 to the extended position 105, the one or more cylinder rods 142 may be pneumatically extended outward from the cylinder block 141 to move the cylinder base 146 away from the cylinder block 141, for example, in a downward direction 10. When transitioning from the extended position 105 to the retracted position 104, the one or more cylinder rods 142 may be pneumatically retracted back into the cylinder block to move the cylinder base 146 toward the cylinder block 141, for example, in an upward direction 12.

The air cylinder 140 is coupled to the propulsion unit 120, in particular, the propulsion unit support bracket 126, such that operation of the air cylinder 140 (e.g., by motion of the one or more cylinder rods 142 and the cylinder base 146) move the propulsion unit 120 between a lifted position 106 (FIG. 1) and a descended position 107 (FIG. 2). When the air cylinder 140 is in the retracted position 104, the propulsion unit 120 is in a lifted position 106 (FIG. 1) and when the air cylinder 140 is in the extended position 105, the propulsion unit 120 is in a descended position 107. In the lifted position 106, the propulsion wheel 124 is a height H from the factory floor 15 and in the descended position 107, the cylinder rods 142 are extended from the cylinder block 141 by the height H and the propulsion wheel 124 is in contact with the factory floor 15. Thus, in the descended position 107, the propulsion unit 120 may provide a drive mechanism to move the mobile assembly support unit 100 around the factory floor 15. While not depicted, the mobile assembly support unit 100 also includes a number of casters, which may be coupled to the platform 110, to provide additional stability to the mobile assembly support unit 100, particularly when the propulsion unit 120 is in the lifted position 106.

Referring still to FIGS. 1 and 2, the mobile assembly support unit 100 further comprises a translation arm 134 coupled to the propulsion unit 120 and engageable with the rotatable sync arm 162. The translation arm 134 may be coupled to the propulsion unit support bracket 126 of the propulsion unit 120 or another component of the propulsion unit 120 and extends away from the propulsion unit 120 toward the rotatable sync arm 162. The translation arm 134 terminates at an end face 135. Because the translation arm 134 is coupled to the propulsion unit 120, the translation arm 134 moves with the propulsion unit 120 due to actuation of the air cylinder 140. When the air cylinder 140 is in the retracted position 104, the translation arm 134, in particular, the end face 135 (FIG. 2) of the translation arm 134 is engaged with the rotatable sync arm 162 and the propulsion unit 120 is in the lifted position 106, as depicted FIG. 1. When the air cylinder 140 is in the extended position, the translation arm 134 is disengaged with the rotatable sync arm 162 and the propulsion unit 120 is in the descended position 107, as depicted in FIG. 2.

Furthermore, engagement and disengagement of the translation arm 134 with the rotatable sync arm 162 facilitates movement of the rotatable sync arm 162 between the line engagement position 102 (FIG. 1) and the line disengagement position 103 (FIG. 2). When the air cylinder 140 is in the retracted position 104, thereby engaging the translation arm 134 with the rotatable sync arm 162, the rotatable sync arm 162 is pushed into the line engagement position 102. When the air cylinder 140 is in the extended position 105, thereby disengaging the translation arm 134 with the rotatable sync arm 162, the spring biasing of the rotatable sync arm 162 rotates the rotatable sync arm 162 into the line disengagement position 103.

As depicted in FIG. 1, when the rotatable sync arm 162 is in the line engagement position 102, the line engagement unit 164 of the rotatable sync arm 162 is in a position to engage with the assembly line block 210 of the assembly line stage 200, such that the mobile assembly support unit 100 may be engaged and synchronized with the assembly line stage 200. As depicted in FIG. 2, when the rotatable sync arm 162 is in the line disengagement position 103, the line engagement unit 164 of the rotatable sync arm 162 is in a rotated away from the assembly line stage 200 and out of alignment with the assembly line block 210, such that the mobile assembly support unit 100 may be removed from engagement and synchronization with the assembly line stage 200.

Indeed, it should be understood that the air cylinder 140 (i.e., a single air cylinder) is both controlling the positioning of the propulsion unit 120 and the rotatable sync arm 162. A single stoke of the air cylinder 140 from the retracted position 104 into the extended position 105 moves both the propulsion unit 120 from the lifted position 106 to the descended position 107 and moves the rotatable sync arm 162 from the line engagement position 102 to the line disengagement position 103. Conversely, a single stoke of the air cylinder 140 from the extended position 105 into the retracted position 104 moves both the propulsion unit 120 from the descended position 107 to the lifted position 106 and moves the rotatable sync arm 162 from the line disengagement position 103 to the line engagement position 102. Providing both of these functions with a single air cylinder 140 reduces the energy usage of the mobile assembly support unit 100 and facilitates synchronous motion of the rotatable sync arm 162 and the propulsion unit 120.

Referring still to FIGS. 1 and 2, the mobile assembly support unit 100 further comprises a mounting structure 180. The air cylinder 140 is coupled to the mounting structure 180 such that the air cylinder 140 is positioned between the mounting structure 180 and the propulsion unit support bracket 126 of the propulsion unit 120. The mounting arm 166 of the assembly line sync mechanism is coupled to the mounting structure 180, opposite the air cylinder 140. Furthermore, the platform 110 is coupled to the mounting structure 180. During operation of the air cylinder 140, the mounting structure 180 remains stationary. In other words, translation of the air cylinder 140 does not induce a corresponding translation of the mounting structure 180. Thus, each of the platform 110, the mounting arm 166 of the assembly line sync mechanism 160, and the mounting structure 180 retain a static position during actuation of the air cylinder 140.

It should now be understood that the embodiments described herein are directed to a mobile assembly support unit that includes an assembly line sync mechanism that facilitates connection with an assembly line platform and a propulsion unit that provides a drive mechanism for the mobile assembly support unit. The mobile assembly support unit includes a single air cylinder to move both the propulsion unit and an actuation arm that is engageable with a rotatable sync arm of the assembly line sync mechanism. Thus, actuation of the air cylinder moves both the propulsion unit and the rotatable sync arm (via the translation arm). Thus provides energy efficient operation when compared to previous synchronization units and facilitates synchronous motion of the assembly line sync mechanism and the propulsion unit.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mobile assembly support unit comprising:

an assembly line sync mechanism comprising a line engagement unit coupled to a rotatable sync arm;

a propulsion unit comprising a propulsion wheel and a propulsion motor;

a translation arm coupled to the propulsion unit and engageable with the rotatable sync arm; and an air cylinder coupled to the propulsion unit, wherein:

the air cylinder is actuatable between a retracted position and an extended position;

when the air cylinder is in the retracted position, the translation arm is engaged with the rotatable sync arm and the propulsion unit is in a lifted position; and when the air cylinder is in the extended position, the translation arm is disengaged with the rotatable sync arm and the propulsion unit is in a descended position.

2. The mobile assembly support unit of claim 1, wherein the rotatable sync arm is rotatable between a line engagement position and a line disengagement position.

3. The mobile assembly support unit of claim 2, wherein the rotatable sync arm is spring biased into the line disengagement position.

4. The mobile assembly support unit of claim 2, wherein when the air cylinder is in the retracted position, thereby engaging the translation arm with the rotatable sync arm, the rotatable sync arm is in the line engagement position.

5. The mobile assembly support unit of claim 1, wherein the line engagement unit comprises a wheel mounted to an end of the rotatable sync arm.

6. The mobile assembly support unit of claim 1, wherein the propulsion motor is a pneumatic air motor.

7. The mobile assembly support unit of claim 1, wherein the assembly line sync mechanism further comprises a mounting arm and the rotatable sync arm is rotatably coupled to the mounting arm.

8. The mobile assembly support unit of claim 1, further comprising a mounting structure, wherein:

the air cylinder is coupled to the mounting structure such that the air cylinder is positioned between the mounting structure and the propulsion unit; and a mounting arm of the assembly line sync mechanism is coupled to the mounting structure, opposite the air cylinder.

9. The mobile assembly support unit of claim 8, further comprising a platform coupled to the mounting structure.

10. The mobile assembly support unit of claim 8, wherein the mounting arm of the assembly line sync mechanism and the mounting structure retain a static position during actuation of the air cylinder.

11. The mobile assembly support unit of claim 1, wherein:

the propulsion unit further comprises a propulsion unit support bracket;

the propulsion wheel and the propulsion motor are each coupled to the propulsion unit support bracket; and the air cylinder is coupled to the propulsion unit support bracket.

* * * * *